(12) United States Patent
Tanaka et al.

(10) Patent No.: US 10,913,328 B2
(45) Date of Patent: Feb. 9, 2021

(54) HEATER DEVICE

(71) Applicant: DENSO CORPORATION, Kariya (JP)

(72) Inventors: Yusuke Tanaka, Kariya (JP); Kimitake Ishikawa, Kariya (JP); Hiroyasu Oide, Kariya (JP); Hideki Seki, Kariya (JP)

(73) Assignee: DENSO CORPORATION, Kariya (JP)

( * ) Notice: Subject to any disclaimer, the term of this patent is extended or adjusted under 35 U.S.C. 154(b) by 275 days.

(21) Appl. No.: 16/071,916

(22) PCT Filed: Nov. 23, 2016

(86) PCT No.: PCT/JP2016/084684
§ 371 (c)(1),
(2) Date: Jul. 23, 2018

(87) PCT Pub. No.: WO2017/130541
PCT Pub. Date: Aug. 3, 2017

(65) Prior Publication Data
US 2019/0023103 A1 Jan. 24, 2019

(30) Foreign Application Priority Data

Jan. 25, 2016 (JP) .................................. 2016-011486

(51) Int. Cl.
*B60H 1/22* (2006.01)
*H05B 3/20* (2006.01)
(Continued)

(52) U.S. Cl.
CPC ....... *B60H 1/2215* (2013.01); *B60H 1/00742* (2013.01); *B60H 1/2226* (2019.05);
(Continued)

(58) Field of Classification Search
None
See application file for complete search history.

(56) References Cited

U.S. PATENT DOCUMENTS 3,088,019 A * 4/1963 Crump ................. B23K 1/0014
219/85.17
3,973,103 A * 8/1976 Tadewald ............... H05B 3/146
219/543
(Continued)

FOREIGN PATENT DOCUMENTS

| CN | 201769360 U | 3/2011 |
| JP | S63127032 A | 5/1988 |

(Continued)

OTHER PUBLICATIONS

3M™ Double Coated Polyethylene Foam Tape 4492W—Technical Data Sheet (Year: 2014).*
(Continued)

*Primary Examiner* — Thor S Campbell
(74) *Attorney, Agent, or Firm* — Harness, Dickey & Pierce, P.L.C.

(57) ABSTRACT

The heater device is provided with a heater main body, and radiates radiant heat from the heater main body toward an object. The heater main body includes a sheet-like heat generating layer that generates heat and radiates the radiant heat, and a sheet-like heat insulating layer that is disposed on the side opposite to the object of the heat generating layer. The heat insulating layer has a sheet-like first layer having voids and a sheet-like second layer having voids arranged side by side in a thickness direction of the heat insulating layer with respect to the first layer. A porosity of the second layer is higher than that of the first layer.

11 Claims, 9 Drawing Sheets

(51) Int. Cl.
*F24C 7/04* (2006.01)
*H05B 3/06* (2006.01)
*B60H 1/00* (2006.01)
*F24D 19/02* (2006.01)

(52) U.S. Cl.
CPC ............ *B60H 1/2227* (2019.05); *F24C 7/04* (2013.01); *F24D 19/02* (2013.01); *H05B 3/06* (2013.01); *H05B 3/20* (2013.01); *H05B 2203/007* (2013.01); *H05B 2203/032* (2013.01)

(56) References Cited

U.S. PATENT DOCUMENTS

| | | | | |
|---|---|---|---|---|
| 4,032,751 | A * | 6/1977 | Youtsey | H05B 3/146 219/538 |
| 5,200,154 | A * | 4/1993 | Harada | F01N 3/2026 219/541 |
| 6,314,216 | B1 * | 11/2001 | Schulte | B41J 2/14129 385/17 |
| 9,482,438 | B2 * | 11/2016 | Coates | F24D 13/022 |
| 9,769,879 | B2 * | 9/2017 | Ota | B60H 1/2215 |
| 10,501,042 | B2 * | 12/2019 | Tanaka | B60R 21/206 |
| 2005/0085146 | A1 * | 4/2005 | Farkas | B32B 5/24 442/134 |
| 2007/0035162 | A1 * | 2/2007 | Bier | B60N 2/56 297/180.15 |
| 2010/0065543 | A1 * | 3/2010 | Dubey | H05B 3/34 219/213 |
| 2012/0061365 | A1 * | 3/2012 | Okamoto | B60H 1/2225 219/202 |
| 2012/0267354 | A1 * | 10/2012 | Okamoto | B60H 1/2227 219/202 |
| 2016/0039265 | A1 * | 2/2016 | Ota | F24H 3/002 165/202 |
| 2016/0059669 | A1 * | 3/2016 | Sagou | B60H 1/2215 392/435 |
| 2016/0059670 | A1 * | 3/2016 | Satzger | H05B 3/22 219/202 |

FOREIGN PATENT DOCUMENTS

| | | |
|---|---|---|
| JP | 2006331752 A | 12/2006 |
| JP | 2010021031 A | 1/2010 |
| JP | 2014189251 A | 10/2014 |
| JP | 2014190674 A | 10/2014 |
| WO | WO-2017047301 A1 | 3/2017 |

OTHER PUBLICATIONS

3M™ Double Coated Urethane Foam Tape 4008—Technical Data Sheet (Year: 2009).*

3M™ Double Coated Urethane Foam Tape 4016—Technical Data Sheet (Year: 2009).*

* cited by examiner

SUPPRESSION OF HEAT CONDUCTION

HEATER DEVICE

CROSS REFERENCE TO RELATED APPLICATIONS

This application is a U.S. National Phase Application under 35 U.S.C. 371 of International Application No. PCT/JP2016/084684 filed on Nov. 23, 2016 and published in Japanese as WO 2017/130541 A1 on Aug. 3, 2017. This application is based on and claims the benefit of priority from Japanese Patent Application No. 2016-011486 filed on Jan. 25, 2016. The entire disclosures of all of the above applications are incorporated herein by reference.

TECHNICAL FIELD

The present disclosure relates to a heater device for radiating radiant heat toward an object.

BACKGROUND ART

Such a heater device is the heater device described in Patent Literature 1. The heater device has a heater main body which is formed in a sheet shape and which radiate the radiant heat toward the object.

The heater main body has a heat generating layer. The heat generating layer has a plurality of heat radiating parts that radiate the radiant heat by heat generated inside. In the heater device, when a user contacts the heater main portion, a temperature at a portion where the user contacts rapidly reduces. In detail, the plurality of heat radiating parts are formed in a film shape. Further, in the plurality of heat radiating parts, a low heat conducting part having a thermal conductivity lower than that of the heat radiating part is disposed between the adjacent radiating parts.

PRIOR ART LITERATURES

Patent Literature 1: Japanese Patent Publication No. 2014-189251

SUMMARY OF INVENTION

In the above mentioned heater device, when the user contacts the heater main body, the temperature at the portion where the user contacts rapidly reduces. Therefore, according to the above mentioned heater device, the heat generating temperature of the heat generating layer can be set high as compared with the conventional heater device that radiates the radiant heat. This makes it possible to improve the heating performance.

However, when the heat generating temperature of the heat generating layer is set high, heat loss due to heat conduction to an opposite side of the object also increases. The opposite side of the object is an opposite side of the object. For this reason, heating efficiency deteriorates. Therefore, the present inventor examined the provision of a heat insulating layer having voids on the opposite side of the object of the heat generating layer. According to this examination, heat loss due to the heat conduction from the heat generating layer to the opposite side of the object can be suppressed. However, when the heat insulating layer is provided, the present inventor has found that the following new problem arose.

A member constituting the heat insulating layer has a heat capacity. Therefore, when the heat insulating layer is provided, the total heat capacity of the heater main body is increased as compared with the case where the heat insulating layer is not provided. That is, the amount of heat accumulated in the heater main body increases. Therefore, there arises a problem that the amount of heat transfer from the heater main body to the user increases when the user touches the heater main body. A thermal discomfort to the user is occurred. This effect can not be obtained particularly when the heat generating layer is configured so that the temperature at the portion touched by the user rapidly decreases when the user contacts the heater main body.

This problem also occurs when the heat generating layer has another configuration for rapidly decreasing the temperature of the portion touched by the user. This problem also occurs when the heat generating layer does not have the above structure.

An object of the present disclosure is to provide the heater device capable of suppressing heat loss from the heater main body to the opposite side of the object and suppressing the amount of heat transfer from the heater main body to the user touching the heater main body.

The heater device of the present disclosure includes a heater main body, and the heater device radiates the radiant heat from the heater main body toward the object.

The heater main body includes a sheet-like heat generating layer that generates heat and radiates the radiant heat, and a sheet-like heat insulating layer that is disposed on the side opposite to the object of the heat generating layer, the heat insulating layer has a sheet-like first layer having voids and a sheet-like second layer having voids arranged side by side in a thickness direction of the heat insulating layer with respect to the first layer, and a porosity of the second layer is higher than that of the first layer.

The heat insulating layer has a first layer having voids and a second layer having voids. Therefore, the heat conduction from the heat generating layer to the side opposite to the object can be suppressed by the heat insulating layer. In particular, the porosity of the second layer is higher than that of the first layer. Therefore, the second layer has a higher effect of suppressing the heat conduction than the first layer. Therefore, according to the heater device of the present disclosure, as compared with the case where the entire heat insulating layer is constituted by a single layer having the same structure as the first layer, the heat loss due to the heat conduction from the heat generating layer to the opposite side of the object can be suppressed.

Also, the porosity of the second layer is higher than that of the first layer. Therefore, the second layer has a heat capacity smaller than that of the first layer. Therefore, according to the heater device of the present disclosure, it is possible to reduce the heat capacity of the entire heat insulating layer, as compared with the case where the entire heat insulating layer is composed of a single layer having the same structure as the first layer. That is, the amount of heat stored in the entire heat insulating layer can be reduced. This makes it possible to suppress the amount of heat transfer from the heater main body to the user who touches the heater main body.

EMBODIMENTS FOR CARRYING OUT INVENTION

Figure 1:
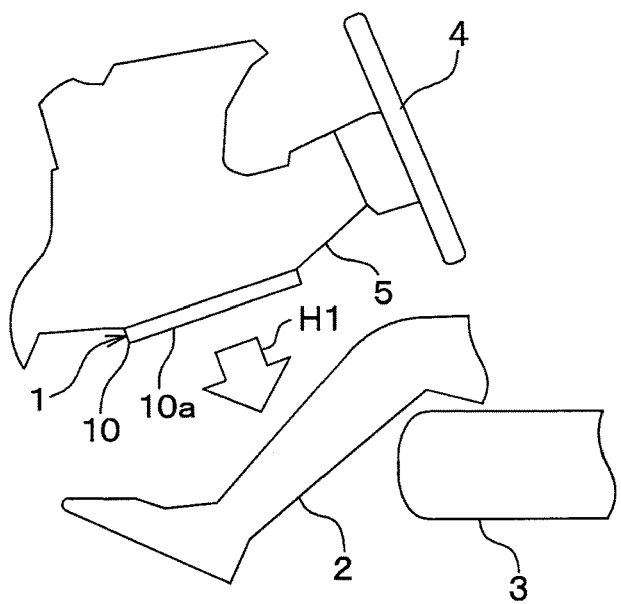
FIG. 1 is a diagram illustrating a schematic view of an interior space in the vehicle provided with a heater device in a first embodiment.

Plural embodiments are explained below with reference to the drawings. In the embodiments, a part that corresponds to a matter described in a preceding embodiment may be assigned with the same reference numeral.

First Embodiment

As shown in FIG. 1, a heater device 1 according to the first embodiment is used for a heating device in a occupant compartment of a road travelling vehicle. In the occupant compartment, a seat 3 on which the occupant 2 sits is provided. In the occupant compartment, a steering column for supporting a steering wheel is provided. The heater device 1 has a heater main body 10 which is formed in a sheet shape. The heater main body 10 is installed on a bottom surface of the steering column 5. The heater main body 10 radiates the radiant heat toward feet of the occupant 2 as a heating object. In other word, the heater main body 10 has one surface so as to face the occupant 2. The heater main body 10 radiates the radiant heat toward the occupant 2 from one surface 10a.

Figure 2:
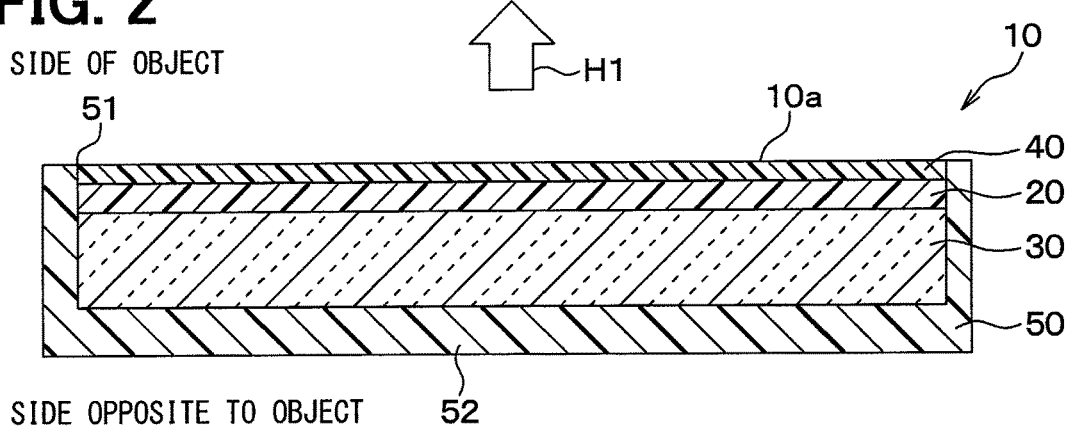
FIG. 2 is a diagram illustrating a schematic cross sectional view of the heater main body in FIG. 1.

As shown in FIG. 2, the heater main body 10 has a heat generating layer 20, a heat insulating layer 30, a surface layer 40, and a housing portion 50. The heat generating layer 20, the heat insulating layer 30, and the surface layer 40 are arranged in the order of the surface layer 40, the heat generating layer 20, and the insulating layer 30 from a side of one surface 10a.

The heat generating layer 20 is formed in a sheet shape. The heat generating layer 20 has one surface on a side of the object and another surface on an opposite side of the object. The heat generating layer 20 radiates the radiant heat H1 by using heat of the heat generating layer 20. Namely, the heat generating layer 20 radiates the radiant heat by heat generated inside.

The heat insulating layer 30 is formed in a sheet shape. The heat insulating layer 30 is disposed on an opposite side of the object with respect to the heat generating layer 20. The heat insulating layer 30 suppresses from transferring heat due to the heat conduction from the heat generating layer 20 to the opposite side of the object. The heat insulating layer 30 supports the heat generating layer 20.

The surface layer 40 is formed in a sheet shape. The surface layer 40 is disposed on a side of the object with respect to the heat generating layer 20. The surface layer 40 is disposed on the outermost surface of the heater main body 10. The surface 40a of the surface layer 40 is one surface 10a of the heater main body 10. The surface layer 40 improves an appearance of the heater main body 10. In addition, the surface layer 40 increases a thermal resistance and suppresses heat transfer due to the heat conduction. The surface layer 40 is made of a resin doth. The surface layer 40 may be made of leather fabric or the like.

The housing portion 50 is formed in a box shape, and the housing portion 50 has an opening part 51 on a side of one surface, and a bottom part 52 on a side of another surface. The housing portion 50 houses a laminating member consisting of the surface layer 40, the heat generating layer 20, and the heat insulating layer 30 therein. The bottom part 52 is disposed on the opposite side of the object with respect to the heat insulating layer 30. The housing portion 50 is made of a synthetic resin. The housing portion 50 is separated from a member constituting a surface of the steering column, namely an instrument panel.

The surface layer 40 and the heat generating layer 20 are fixed by an adhesion. The heat generating layer 20 and the heat insulating layer 30 are fixed by an adhesion. The heat insulating layer 30 and the housing portion 50 is fixed by an adhesion.

Next, the detail configuration of the heat generating layer 20 is explained in detail.

Figure 3:
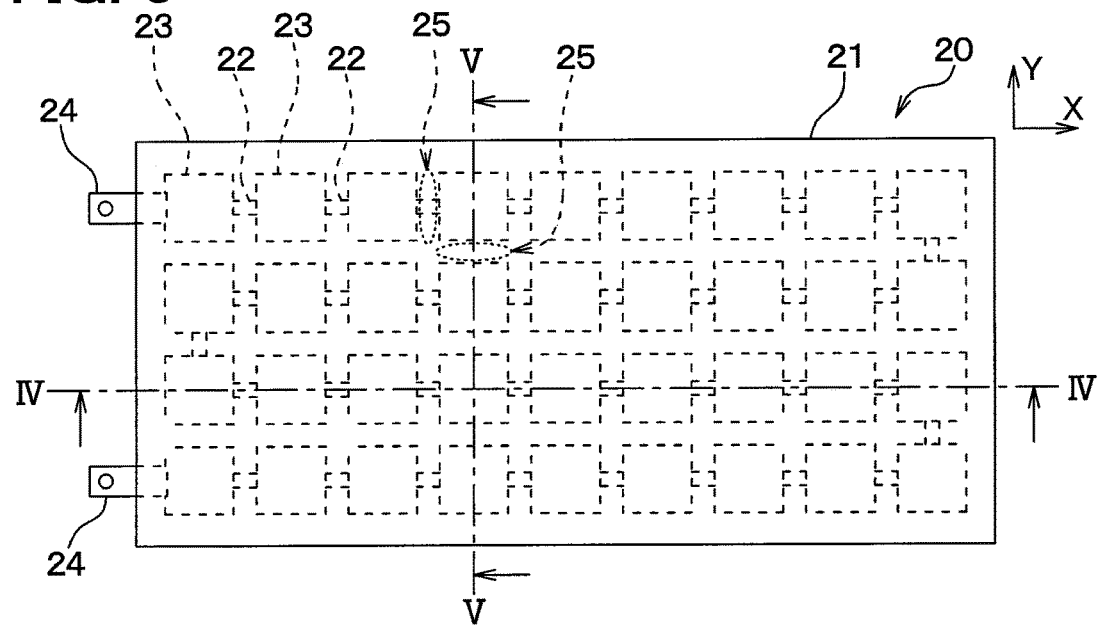
FIG. 3 is a diagram illustrating a plan view of a heat generating layer in FIG. 2.
Figure 4:
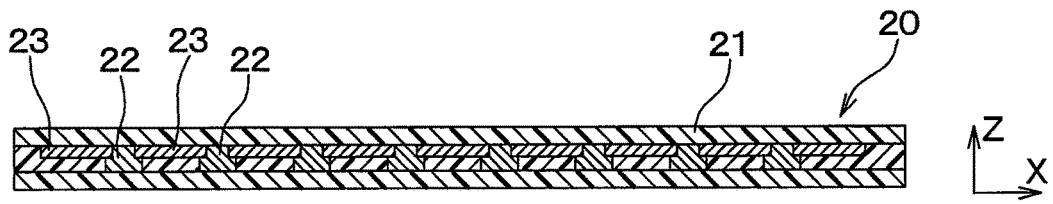
FIG. 4 is a diagram illustrating a cross sectional view taken along line IV-IV in FIG. 3.

As shown in FIG. 3, the heat generating layer 20 extends along both directions of an axis X direction and an axis Y direction. A planar shape of the heat generating layer 20 is substantially square. As shown in FIG. 4, the heat generating layer 20 has thickness in an axis Z direction. The heat generating layer 20 is called as a planar heater which radiates the radiant heat H1 mainly in a direction perpendicular to the surface.

As shown in FIGS. 3 and 4, the heat generating layer 20 has a substrate part 21, a plurality of heat generating parts 22, a plurality of heat radiating parts 23, and a pair of terminals 24.

The substrate part 21 forms an outer shape of the heat generating layer 20. A plurality of heat generating parts 22 and a plurality of heat radiating parts 23 are arranged inside the substrate part 21. The substrate part 21 is a member that supports the plurality of heat generating parts 22 and the plurality of heat radiating parts 23. The substrate part 21 is made of a synthetic resin. The synthetic resin is, for example, a thermoplastic resin.

The plurality of heat generating parts 22 and the plurality of heat radiating parts 23 are arranged such that the heat generating part 22 and the heat radiating part 23 are arranged alternately one by one. Adjacent heat generating parts 22 and heat radiating parts 23 are connected. The plurality of heat generating parts 22 and the plurality of heat radiating parts 23 form a series of energizing paths between the pair of terminals 24.

One heat generating part 22 is heated by energizaiton. One heat generating part 22 supplies heat to the adjacent heat radiating part 23. One heat generating part 22 is made of a metal material.

One heat radiating part 23 radiates the heat radiant H1 by heat supplied from the adjacent heat generating part 22. One heat radiating part 23 is made of a metal material which has an electrical resistance lower than that of the metal material constituting the heat generating part 22.

One heat radiating part 23 is filmy. The volume of one heat generating part 22 is equal to or less than the volume of one heat radiating part 23. Thereby, one heat generating part 22 and one heat radiating part 23 are small in volume and small in heat capacity.

As shown in FIG. 3, a low heat conducting part 25 is present between adjacent heat radiating parts 23. The low heat conducting part 25 is a portion having lower thermal conductivity than the heat radiating part 23. The low heat conducting part 25 thermally separates adjacent radiating parts 23 from each other. The low heat conducting part 25 is made of the material constituting the substrate part 21.

Figure 5:
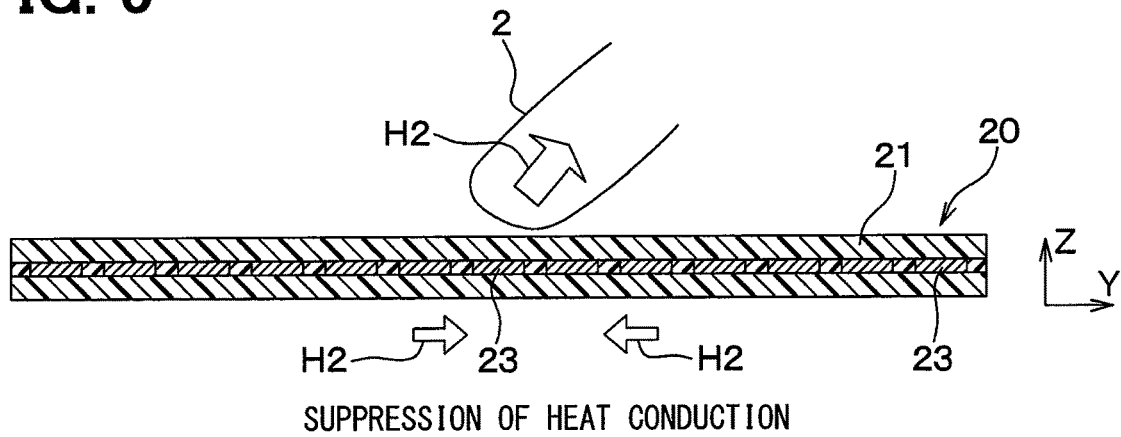
FIG. 5 is a diagram illustrating a cross sectional view taken along line V-V in FIG. 3.

As shown in FIG. 5, the object, that is, a finger of the occupant 2 may touch the surface of the heat generating layer 20 above one specific heat radiating part 23. In this case, the heat H2 of the specific heat radiating part 23 is rapidly transmitted to the touching object. The low heat conducting part 25 suppresses the transmitting of the heat H2 due to the heat conduction from the periphery of the specific heat radiating part 23 to the specific heat radiating part 23. As a result, the temperature of the specific heat radiating part 23 rapidly decreases. Therefore, the surface temperature of the heat generating layer 20 at the portion touched by the object rapidly decreases. In this manner, the heat generating layer 20 is configured so as to exert the effect that the temperature of the portion touched by the occupant 2 rapidly decreases when the occupant 2 touches the heater main body 10.

Figure 6:
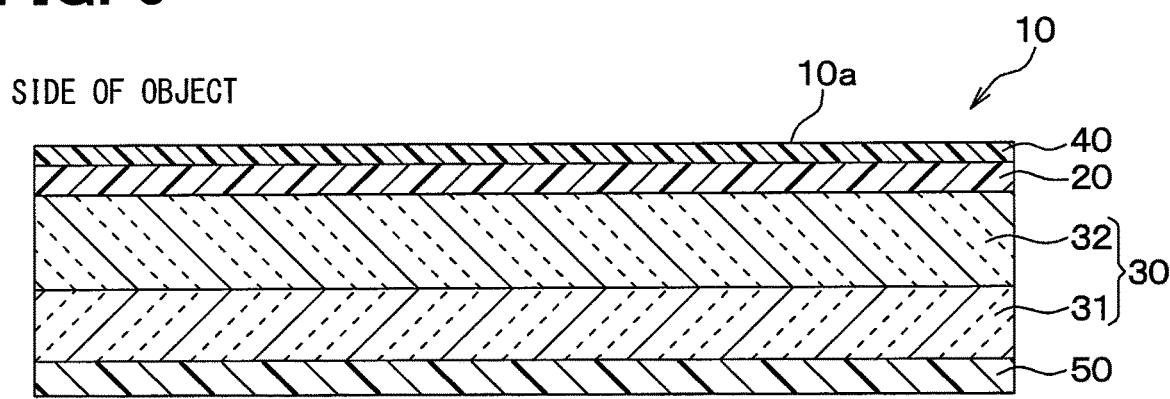
FIG. 6 is an explanatory diagram corresponding to the heater main body shown in FIG. 2, and illustrating a cross sectional view of the heater main body showing a structure of the heat insulating layer more specifically.

As shown in FIG. 6, the heat insulating layer 30 has a first layer 31 and a second layer 32. The first and second layers 31, 32 are formed in a sheet shape, and have voids. The second layer 32 is arranged side by side with respect to the first layer 31 in a thickness direction of the heat insulating layer 30. The thickness direction of the heat insulating layer 30 is same as the thickness direction of the heater main body 10.

In detail, the first layer 31 is arranged on the opposite side of the object in the heat insulating layer 30. The second layer 32 is arranged on the side of the object in the heat insulating layer 30. In other word, the second layer 32 is arranged on a side of the heat radiating layer 20 with respect to the first layer 31. A porosity of the second layer 32 is higher than that of the first layer 31. The porosity is a fraction of voids to the total volume of layered member. The porosity has a same meaning as an air content.

In the present embodiment, both the first layer 31 and the second layer 32 are fabrics woven with a plurality of fibers which is made of a synthetic resin. As synthetic resin fibers, for example, PET (poly-ethylene-terephthalate) fibers can be listed. The woven fabric is a kind of cloth made of a plurality of fibers. In other words, the woven fabric is a type of fiber aggregate composed of a plurality of fibers.

Fibers of the same material are used for the first layer 31 and the second layer 32. In the first layer 31 and the second layer 32, the weaving of fibers is the same. In the first layer 31, the sizes of a plurality of voids surrounded by fibers are uniform. Also in the second layer 32, the sizes of a plurality of voids surrounded by fibers are uniform. The size of each of the voids of the second layer 32 is larger than the size of each of the voids of the first layer 31. Thereby, the porosity of the second layer 32 is made higher than the porosity of the first layer 31.

Also, the first layer 31 and the second layer 32 are woven together. Therefore, the first layer 31 and the second layer 32 are fixed to each other. That is, the layers 31 and 32 constituting the heat insulating layer 30 are fixed to each other. As a result, in assembling the heater main body 10, it is possible to reduce the number of assembling steps as compared with the case where the first layer 31 and the second layer 32 are not fixed to each other.

Next, an operation of the heater device 1 in the embodiment is explained. When the heater device 1 is operated, the energization between the pair of the terminals 24 is started. Each of the plurality of heat generating parts 22 generates heat. Each of the plurality of heat generating parts 22 supplies heat to each of the plurality of adjacent heat radiating parts 23. As a result, the radiant heat H1 is radiated from each of the plurality of heat radiation parts 23. In this way, when the heat generating layer 20 is energized, the heat generating layer 20 generates heat and the radiant heat H1 is released. The radiant heat H1 is radiated toward the foot of the occupant 2 through the surface layer 40 from the heat generating layer 20.

Figure 7:
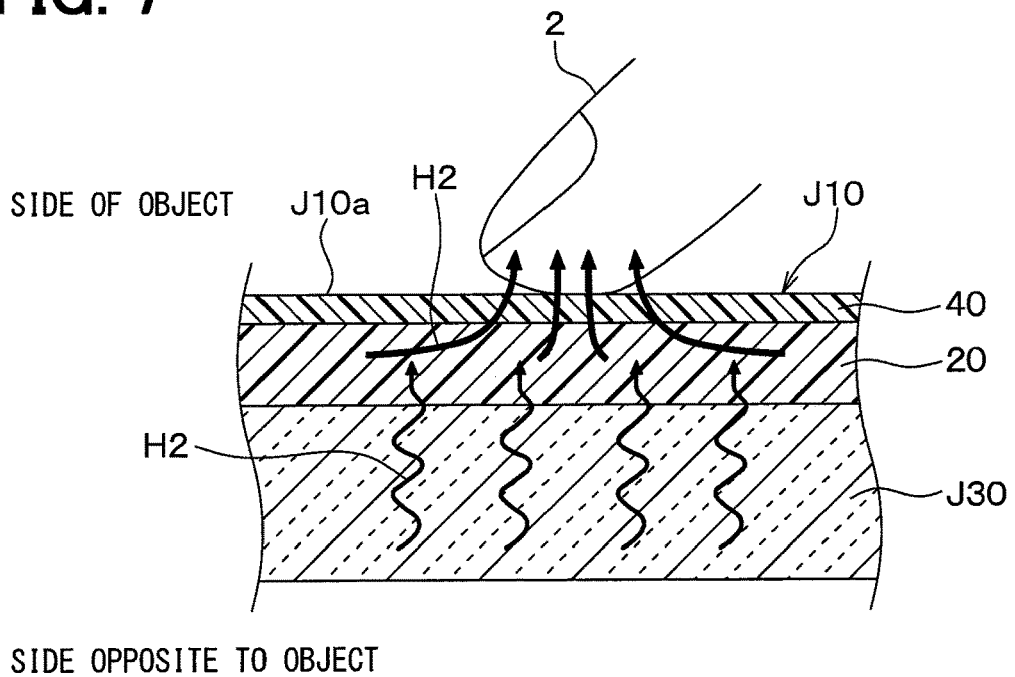
FIG. 7 is a diagram illustrating a cross sectional view of a heater main body in a comparative example 1.

Next, the effect of the heater device 1 in the present embodiment will be described. The heater device 1 in the present embodiment is compared with the heater device in a comparative example 1 shown in FIG. 7.

The heater device in the comparative example 1 includes a heater main body J10. The heater main body J10 of the comparative example 1 has a heat generating layer 20, a heat insulating layer J30, and a surface layer 40. The whole of the heat insulating layer J30 is formed of a single layer having the same structure as the first layer 31 of the heater device 1 of the present embodiment. That is, in the heater device of the comparative example 1, the entire heat insulating layer J30 is composed only of the first layer 31.

During the operation of the heater main body J10, heat is transferred from the heat generating layer 20 to a member constituting the heat insulating layer J30 by the heat conduction. For this reason, heat is stored in the members constituting the heat insulating layer J30. When the heater main body J10 is in operation, the occupant 2, who is a user of the heater device, may touch the one side J10a of the heater main body J10. At this time, in the heater device of the comparative example 1, the heat H2 stored in the heat insulating layer J30 moves to the occupant 2 that touched one surface J10a of the heater main body J10 through the heat generating layer 20. In this way, in addition to the heat of the heat generating layer 20, the heat H2 stored in the heat insulating layer J30 moves to the occupant 2. For this reason, a thermal discomfort is generated in the occupant 2. In particular, when the heat generating layer 20 is configured to exert the effect of rapidly lowering the temperature of the portion touched by the occupant 2 when the occupant 2 touches it, this effect can not be obtained. That is, when the occupant 2 touches one face J10a of the heater main body J10, the temperature of the touched part is hardly lowered.

Figure 8:
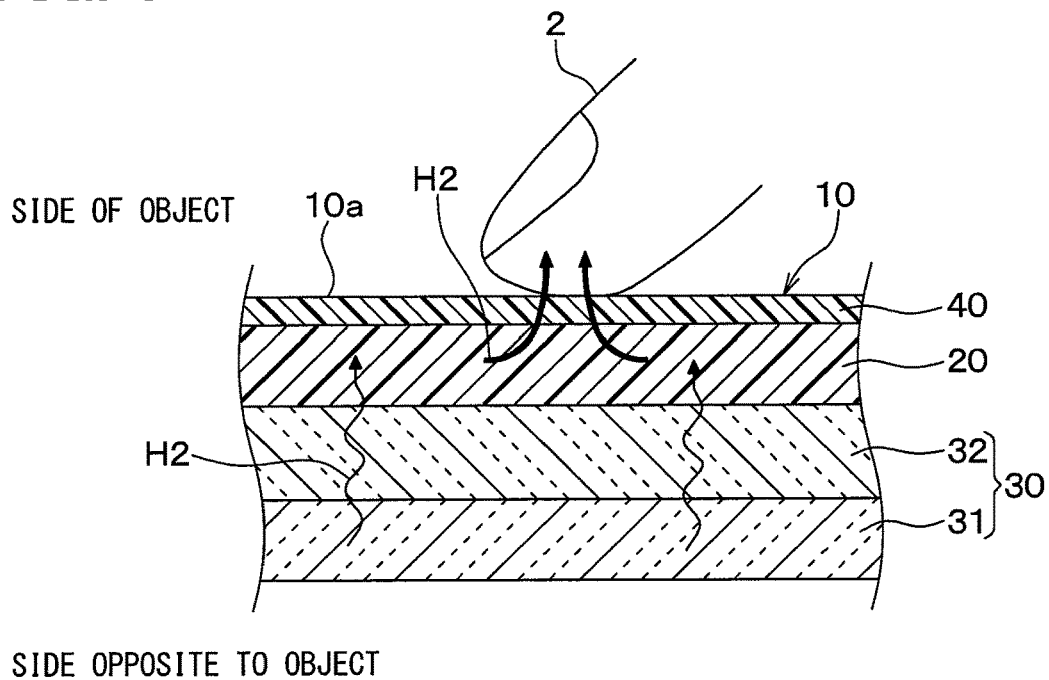
FIG. 8 is a diagram showing a cross sectional view of the heater main body in the first embodiment.

In contrast, in the heater device 1 of the present embodiment, as shown in FIG. 8, the heat insulating layer 30 has a first layer 31 having voids and a second layer 32 having voids. The porosity of the second layer 32 is higher than that of the first layer 31. Therefore, the second layer 32 has a heat capacity smaller than that of the first layer 31. Therefore, according to the heater device 1 of the present embodiment, as compared with the heater device of the comparative example 1, the heat capacity of the entire heat insulating layer 30 can be reduced. That is, the amount of heat stored in the entire heat insulating layer 30 can be reduced. This makes it possible to suppress the amount of heat transfer from the heat insulating layer 30 to the occupant 2 contacting the surface 10a of the heater main body 10 via the heat generating layer 20. As a result, occurrence of thermal discomfort to the occupant 2 can be suppressed. In particular, in the heater device 1 of the present embodiment, the heat generating layer 20 is configured to be capable of exerting the effect of lowering the temperature of the portion touched by the occupant 2 when the occupant 2 touches it. Therefore, according to the heater device 1 of the present embodiment, it is possible to avoid impairing this effect.

Furthermore, in the heater device 1 of the present embodiment, the second layer 32 is disposed on the side of the heat generating layer 20 with respect to the first layer 31. As described above, the second layer 32 has a higher effect of suppressing the heat conduction than the first layer 31. Therefore, the heat conduction from the heat generating layer 20 to the first layer 31 can be suppressed by the second layer 32.

This makes it possible to suppress the amount of heat stored in the first layer 31 at the time of operation of the heater main body 10 as compared with the case where the second layer 32 is disposed on the side opposite of the heat generating layer 20 with respect to the first layer 31. Therefore, according to the heater device 1 of the present embodiment, compared to the case where the second layer 32 is disposed on the side opposite of the heat generating layer 20 with respect to the first layer 31, the amount of heat stored in the entire heat insulating layer 30 can be more reduced. Accordingly, the amount of heat transfer from the heat insulating layer 30 to the occupant 2 in contact with the heater main body 10 via the heat generating layer 20 can be further suppressed.

Further, according to the heater device 1 of the present embodiment, the heat conduction from the heat generating layer 20 to the side opposite to the object can be suppressed by the heat insulating layer 30 having the first layer 31 and the second layer 32. In particular, the second layer 32 has the porosity higher than that of the first layer 31. Therefore, the second layer 32 has a higher effect of suppressing heat conduction than the first layer 31. Therefore, according to the heater device 1 of the present embodiment, compared to the heater device of the comparative example 1, the heat loss due to the heat conduction from the heat generating layer 20 to the side opposite to the object can be further suppressed.

Further, the porosity of the first layer 31 is lower than that of the second layer 32. Therefore, the first layer 31 has a higher effect of blocking the radiant heat than the second layer 32. Therefore, the transferring of the radiation heat from the heat generating layer 20 to the side opposite to the object can be suppressed by the first layer 31. That is, according to the heater device 1 of the present embodiment, it is possible to suppress the heat loss due to radiation of the radiant heat from the heat generating layer 20 to the side opposite to the object.

Therefore, according to the heater device 1 of the present embodiment, it is possible to suppress the heat transfer from the heat generating layer 20 to the housing portion 50 and the heat transfer due to radiation of the radiant heat. Therefore, it is possible to suppress the transferring of heat from the housing portion 50 to its surroundings. This makes it possible to improve the heating rate of the heat generating layer 20. The occupant 2 can be promptly warmed up at the start of operation of the heater main body 10. Further, it is possible to reduce the energy amount of the heat source used for heat generation of the heat generating layer 20. In addition, the temperature of the housing portion 50 can be lowered. As a result, an inexpensive material can be used as a material constituting the housing portion 50. Further, it is possible to suppress the occurrence of thermal malfunction in the parts existing around the housing portion 50 due to the temperature increase of the housing portion 50.

Second Embodiment

Figure 9:
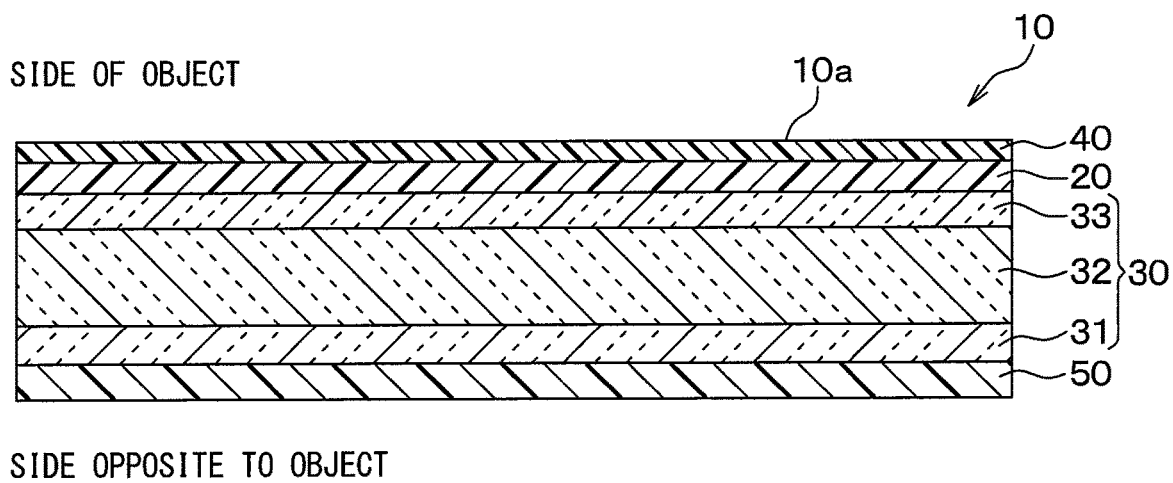
FIG. 9 is a diagram showing a cross sectional view of a heater main body in a second embodiment.

As shown in FIG. 9, in the heater device 1 of the present embodiment, the heat insulating layer 30 has a third layer 33 having voids in addition to the first layer 31 and the second layer 32. The third layer 33 is in the form of a sheet. The third layer 33 is disposed on a side of the heat generating layer 20 with respect to the second layer 32. The third layer 33 has a porosity lower than that of the second layer 32. The porosity of the third layer 33 is higher than that of the first layer 31. The first layer 31, the second layer 32, and the third layer 33 are made of a woven fabric of synthetic resin fibers. The first layer 31, the second layer 32, and the third layer 33 have the same weave of fibers. In the first layer 31, the sizes of a plurality of voids surrounded by fibers are uniform. Also in the second layer 32, the sizes of a plurality of voids surrounded by fibers are uniform. Also in the third layer 33, the sizes of a plurality of voids surrounded by fibers are uniform. The size of each of the voids of the first layer 31, the size of each of the voids of the second layer 32, and the size of each of the voids of the third layer 33 are different. Thereby, the porosity of the third layer 33 is different from the porosity of the first layer 31 and the porosity of the second layer 32. In addition, the first layer 31, the second layer 32, and the third layer 33 are woven together. Therefore, the first layer 31, the second layer 32, and the third layer 33 are fixed to each other. That is, the layers 31, 32, 33 constituting the heat insulating layer 30 are fixed to each other.

According to the heater device 1 of the present embodiment, the same effect as that of the heater device 1 of the first embodiment is achieved by the configuration common to the heater device 1 of the first embodiment. Further, according to the heater device 1 of the present embodiment, the following effects are obtained.

Generally, the layer having voids tends to deform as the porosity increases. That is, if the weaving of fibers is the same, the higher the porosity, the easier it is to deform. Therefore, in the case where the second layer 32 having a higher porosity than that of the first layer 31 is adjacent to the heat generating layer 20, when the occupant 2 touches one surface 10a of the heater main body 10, the portion touched by the occupant 2 is easy to dent. On the other hand, in a state where the heater main body 10 is installed, the surface of the steering column 5, which is a peripheral member of the heater main body 10, is not dented only even if the occupant 2 touches it. Therefore, the feeling when the occupant 2 touches the one surface 10a of the heater main body 10 and the feeling when the occupant 2 touches the surface of the steering column 5 are very different.

On the other hand, in the heater device 1 of the present embodiment, the third layer 33 having the lower porosity than that of the second layer 32 is disposed between the heat generating layer 20 and the second layer 32. Generally, the lower the porosity of the layer having voids, the higher the modulus of elasticity. Therefore, the elastic modulus of the third layer 33 is larger than that of the second layer 32. Therefore, compared with the case where the third layer 33 is not provided, when the occupant 2 touches the one surface 10a of the heater main body 10, it is possible to make it difficult to dent the portion touched by the occupant 2. Therefore, according to the heater device 1 of the present embodiment, it is possible to reduce the difference between the feeling when the occupant 2 touches the one surface 10a of the heater main body 10 and the feeling when the occupant 2 touches the surface of the steering column 5.

In the heater device 1 of the present embodiment, the porosity of the third layer 33 is higher than that of the first layer 31, but is not limited thereto. The porosity of the third layer 33 may be lower than that of the first layer 31.

However, in the case where the porosity of the third layer 33 is higher than the porosity of the first layer 31, as compared with the case where the porosity of the third layer 33 is lower than the porosity of the first layer 31, the total heat capacity of the heat insulating layer 30 can be reduced. That is, the amount of heat accumulated in the heat insulating layer 30 during operation of the heater body portion 10 can be reduced. Therefore, the porosity of the third layer 33 is preferably higher than the porosity of the first layer 31.

Third Embodiment

The heater device 1 of the present embodiment is different from the heater device 1 of the second embodiment in the structure of the second layer 32. That is, the weaving of the fibers in the second layer 32 is different from the first layer 31 and the third layer 33.

Figure 10A:
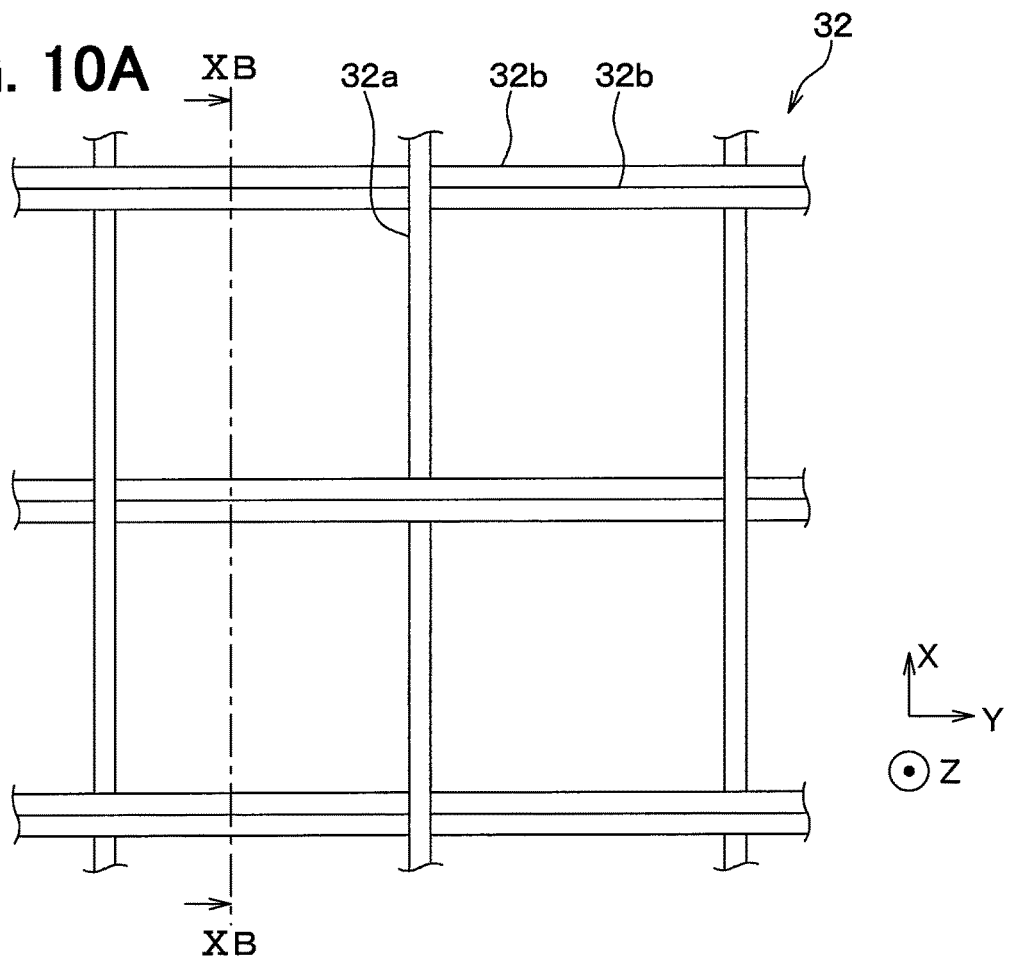
FIG. 10A is a diagram illustrating a plan view of a part of a second layer in a third embodiment.

As shown in FIGS. 10A, 10 B and 10 C, the second layer 32 is a fabric having a three-dimensional warp structure. Specifically, the second layer 32 is a woven fabric in which the warps 32a and the wefts 32b are woven in the axis X direction and axis Y direction in the figure while forming the relief in the Z direction in the drawing. An U-shaped three-dimensional part 32c extending in the axis Z direction is formed by the warp 32a. The axis Z direction in the figure is the thickness direction of the second layer 32. In other words, the axis Z direction is the lamination direction of the first layer 31 and the second layer 32. The axis X direction and the axis Y direction in the figure are directions in which the second layer 32 spreads like a sheet.

Figure 11A:
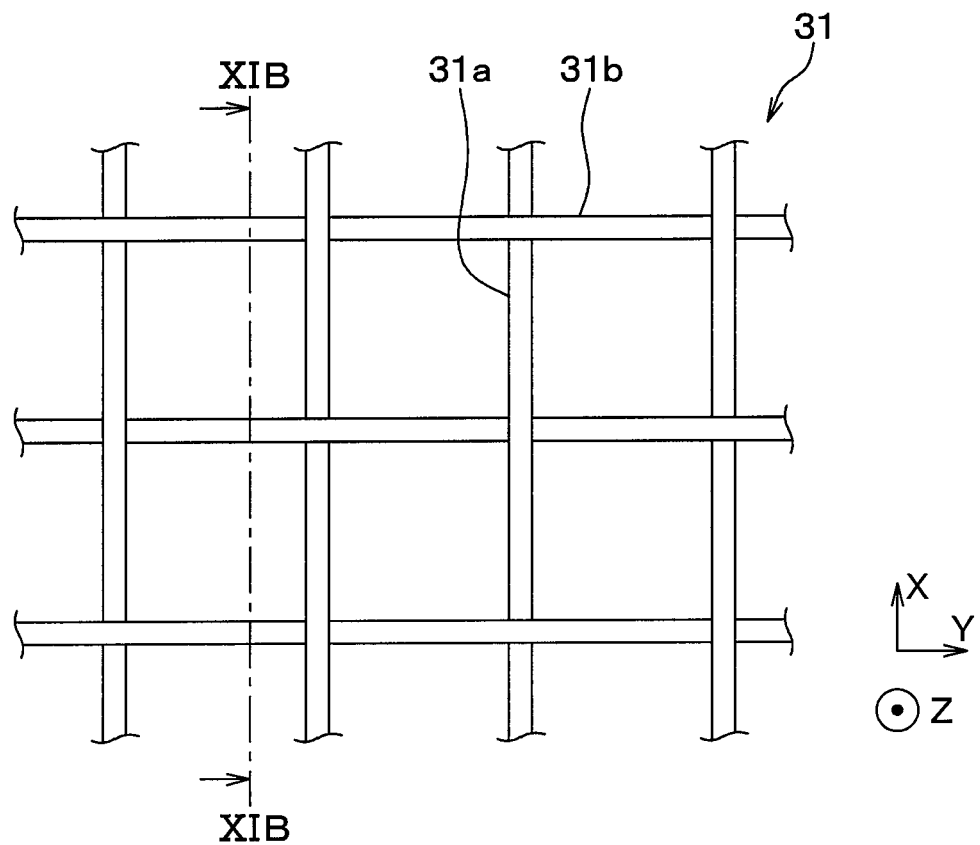
FIG. 11A is a diagram illustrating a plan view of a part of a first layer in the third embodiment.
Figure 11B:
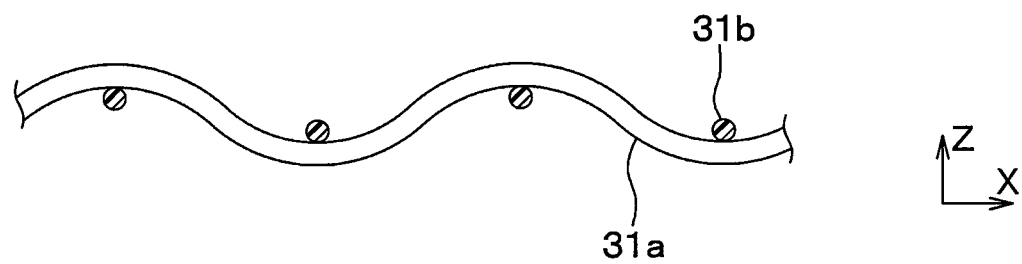
FIG. 11B is a diagram illustrating a cross sectional view of the first layer taken along line XIB-XIB in FIG. 11A.

As shown in FIGS. 11A and 11B, the first layer 31 is made of a woven fabric in which the warp 31a and the weft 31b are woven in the axis X direction and the axis Y direction in the drawing. The warp 31a of the first layer 31 has smaller undulations in the axis Z direction than the warp 32a of the second layer 32.

In other words, the second layer 32 is woven with the warp 32a and the weft 32b so that the undulations in the axis Z direction are greater than the warp 31a and the weft 31b of the first layer 31. Therefore, the elastic modulus of the entire second layer 32 is larger than the elastic modulus of the entire first layer 31.

Although not shown, the third layer 33 is composed of a woven fabric woven in the same weave manner as the first layer 31. The third layer 33 has the porosity lower than that of the second layer 32. The porosity of the third layer 33 is higher than that of the first layer 31. The elastic modulus of the third layer 33 is larger than that of the second layer 32. Thus, according to the heater device 1 of the present embodiment, the same effect as that of the heater device 1 of the second embodiment can be obtained. Further, according to the heater device 1 of the present embodiment, the following effects are obtained.

In the present embodiment, the first layer 31 is composed of a woven fabric in which a plurality of fibers 31a, 31b are woven. The second layer 32 is made of a woven fabric in which a plurality of fibers 32a, 32b are woven. The warp 32a of the plurality of fibers constituting the second layer 32 has a state in which the undulation in the thickness direction of the second layer 32 is larger than that of the plurality of fibers 31a and 31b constituting the first layer 31. As a result, even if the porosity of the second layer 32 is higher than the porosity of the first layer 31, the repulsive force of the second layer 32, which is generated when the second layer 32 is pressed, can be made higher. Therefore, as compared with the case where the elastic modulus of the entirety of the second layer 32 is smaller than the elastic modulus of the entirety of the first layer 31, the second layer 32 is more resistant to the load when the second layer 32 is pressed.

Thus, when the occupant 2 touches one surface 10a of the heater main body 10, it is possible to make it difficult to dent the portion touched by the occupant 2. Therefore, according to the heater device 1 of the present embodiment, it is possible to reduce the difference between the feeling when the occupant 2 touches the one surface 10a of the heater main body 10 and the feeling when the occupant 2 touches the surface of the steering column 5.

The first layer 31 may be composed of a cloth made of a plurality of fibers other than the woven fabric. Examples of the cloth other than the woven fabric include a knitted fabric formed by knitting a plurality of fibers and a nonwoven fabric made of a plurality of fibers.

Further, the structures of the first layer 31 and the second layer 32 in this embodiment may be applied to the heat insulating layer 30 of the first embodiment.

Fourth Embodiment

Figure 12:
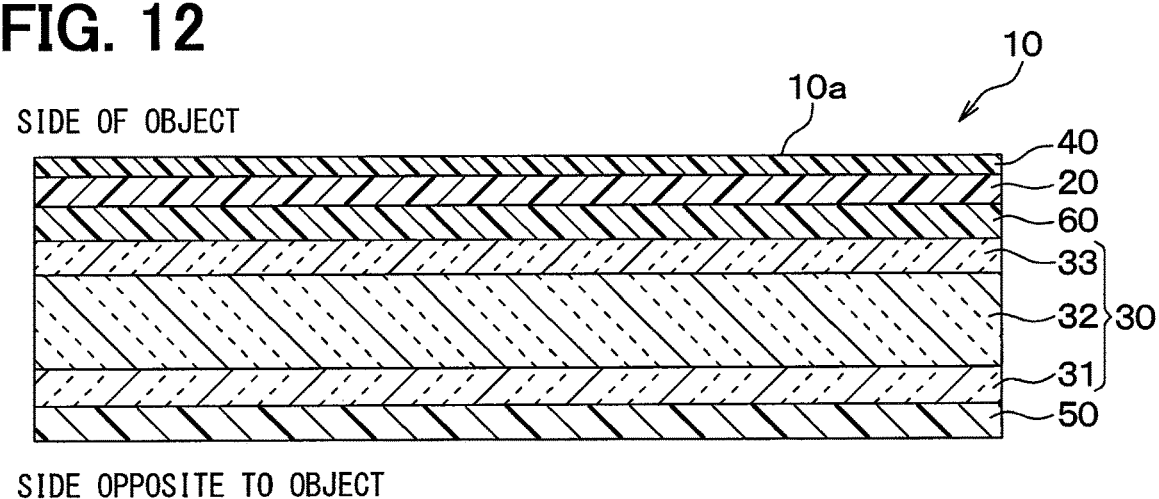
FIG. 12 is a cross sectional view of the heater main body according to a fourth embodiment.

As shown in FIG. 12, the heater device 1 of the present embodiment is different from the heater device 1 of the third embodiment in which a detection layer 60 is added to the heater main body 10.

The detection layer 60 is disposed on the side opposite to the object with respect to the heat generating layer 20. The detection layer 60 is disposed on the object side with respect to the heat insulating layer 30. That is, the detection layer 60 is disposed between the heat generating layer 20 and the heat insulating layer 30. The detection layer 60 is a layer for detecting that the object touches one surface 10a of the heater main body 10. The detection layer 60 of the present embodiment is a detection layer as a pressure sensitive contact point that detects that the one surface 10a of the heater main body 10 is pressed.

Figure 13:
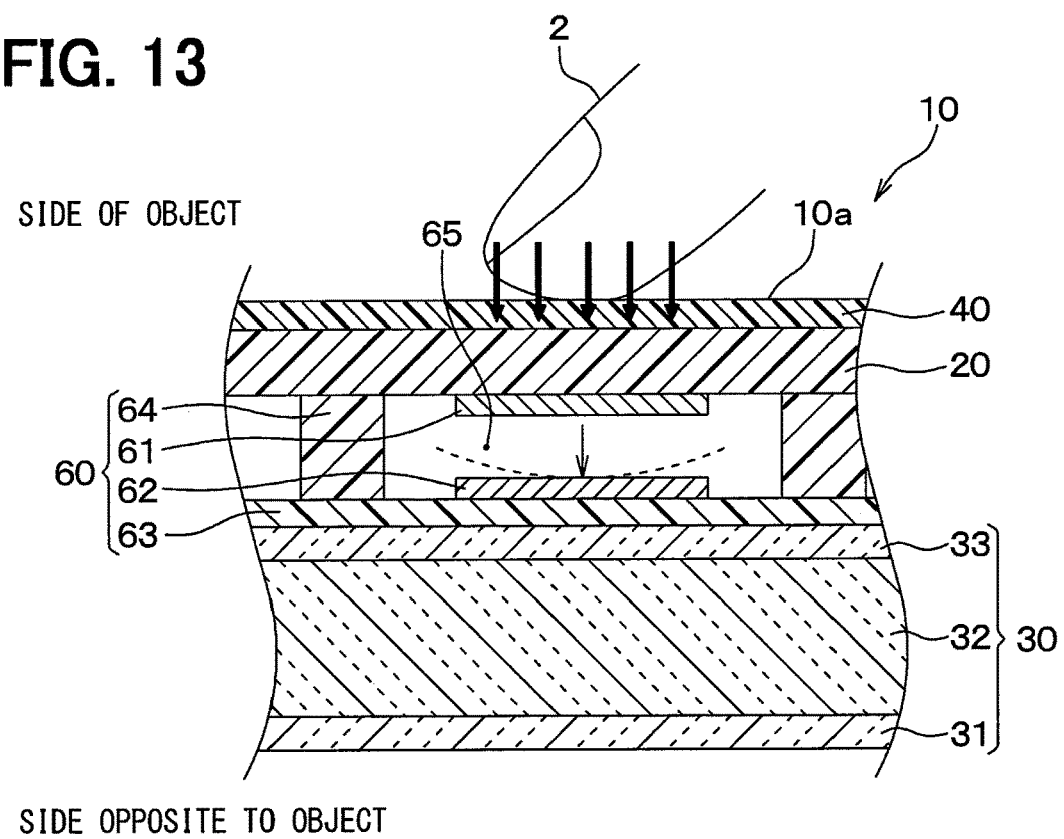
FIG. 13 is a diagram illustrating an enlarged view of the heater main body in FIG. 12.

As shown in FIG. 13, the detection layer 60 has a plurality of first conductive parts 61, a plurality of second conductive parts 62, an insulating layer 63, and a plurality of spacers 64. In FIG. 13, one first conductive part 61 and one second conductive part 62 are shown.

Both of the first conductive part 61 and the second conductive part 62 are formed in a sheet shape. The first conductive part 61 and the second conductive part 62 are made of a conductive material such as a metal material. The first conductive part 61 and the second conductive part 62 are arranged to face each other across the air layer 65 in the thickness direction of the heater main body 10. The first conductive part 61 is disposed on the heat generating layer 20 on a side of the air layer 65. The second conductive part 62 is disposed on the side of the heat insulating layer 30 in the air layer 65. The first conductive part 61 is fixed to the surface of the heat generating layer 20 on the opposite side of the object by adhesion. The second conductive part 62 is fixed to the surface of the insulating layer 63 on the side of the object.

The insulating layer 63 is formed in a sheet shape. The insulating layer 63 is made of an insulating material such as a synthetic resin. The insulating layer 63 is fixed to the heat insulating layer 30 by adhesion. The spacer 64 maintains a gap between the heat generating layer 20 and the insulating layer 63. The spacer 64 is made of an insulating material such as a synthetic resin.

One surface 10a of the heater main body 10 is sometimes pressed by the occupant 2. At this time, the heating layer 20 and the first conductive part 61 are deformed. As a result, the first conductive part 61 and the second conductive part 62 are brought into contact with each other. The first conductive part 61 and the second conductive part 62 are brought into a conductive state. Thus, it is possible to detect that the one surface 10a of the heater main body 10 is pressed.

Figure 14:
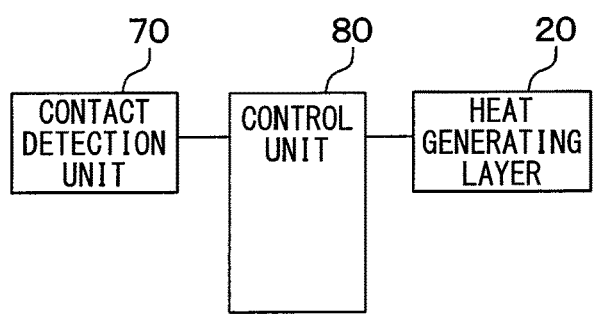
FIG. 14 is a block chart illustrating an electrical configuration of the heater device in the fourth embodiment.

As shown in FIG. 14, the heater device 1 includes a contact detection unit 70 and a control unit 80.

Based on whether or not the state between the first conductive part 61 and the second conductive part 62 is in an energized state, the contact detection unit 70 outputs a signal indicating whether or not an object is in contact with the one surface 10a of the heater main body 10 to the control unit 80.

Specifically, the contact detection unit 70 is composed of an electric circuit in which a first conductive part 61, a second conductive part 62, a resistor (not shown), and a power supply (not shown) are connected in series. When the object is not in contact with the one surface 10a of the heater main body 10, a non-conducting state is established between the first conductive part 61 and the second conductive part 62. At this time, a voltage between the terminals of the resistor becomes less than the predetermined voltage. Therefore, the contact detection unit 70 outputs a signal indicating that the object is not in contact with the one surface 10a of the heater main body 10 to the control unit 80. On the other hand, when the object is brought into contact with the one surface 10a of the heater main body 10 and the first conductive part 61 and the second conductive part 62 are in contact with each other, the first conductive part 61 and the second conductive part 62 are in an energized state. At this time, the voltage between the terminals of the resistor becomes equal to or higher than the predetermined voltage. Therefore, the contact detection unit 70 outputs a signal indicating that the object is in contact with the one surface 10a of the heater main body 10 to the control unit 80.

The control unit 80 is configured as a computer including a CPU, a RAM, a ROM, an I/O, and the like. The CPU executes various processes according to a program stored in the ROM.

Figure 15:
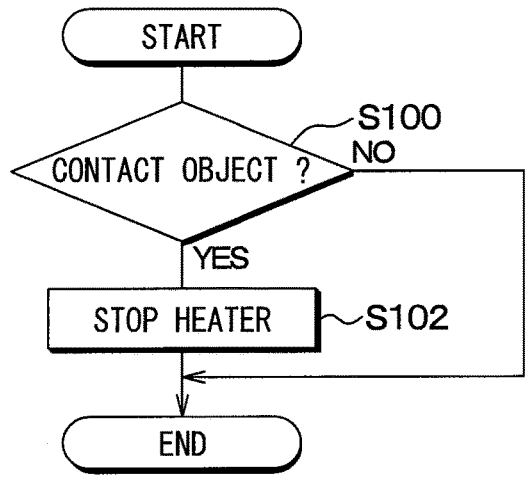
FIG. 15 is a flow chart of a control unit in the fourth embodiment.

As shown in FIG. 15, when the object touches one surface 10a of the heater main body 10, the control unit 80 executes a control to stop the energization of the heat generating layer 20. The control unit 80 repeatedly executes the processing shown in FIG. 15. Each control step in the flowchart of FIG. 15 constitutes various function realizing sections of the control unit 80.

First, in step S100, it is determined whether or not the object comes into contact with the one surface 10a of the heater main body 10 based on the input signal input from the contact detection unit 70.

At this time, when the input signal is a signal indicating that the object is not in contact, NO determination is made and the present process is terminated.

On the other hand, if the input signal is a signal indicating that the object is in contact, YES is determined, and the process proceeds to step S102. In step S102, the energization to the heat generating layer 20 is stopped. That is, the operation of the heater main body 10 is stopped. Thereafter, the present process is terminated. In step S102, the control unit 80 stops energizing the heat generating layer 20, but may decrease the energization amount applied to the heat generation part 22.

According to the heater device 1 of the present embodiment, it is possible to control so that the temperature of the heat generating layer 20 decreases when the occupant 2 comes in contact with the one surface 10a of the heater main body 10 by means of the detection layer 60. Thereby, when the occupant 2 continues to touch the one surface 10a of the heater main body 10, the occurrence of thermal discomfort for the occupant 2 can be suppressed.

Fifth Embodiment

Figure 16:
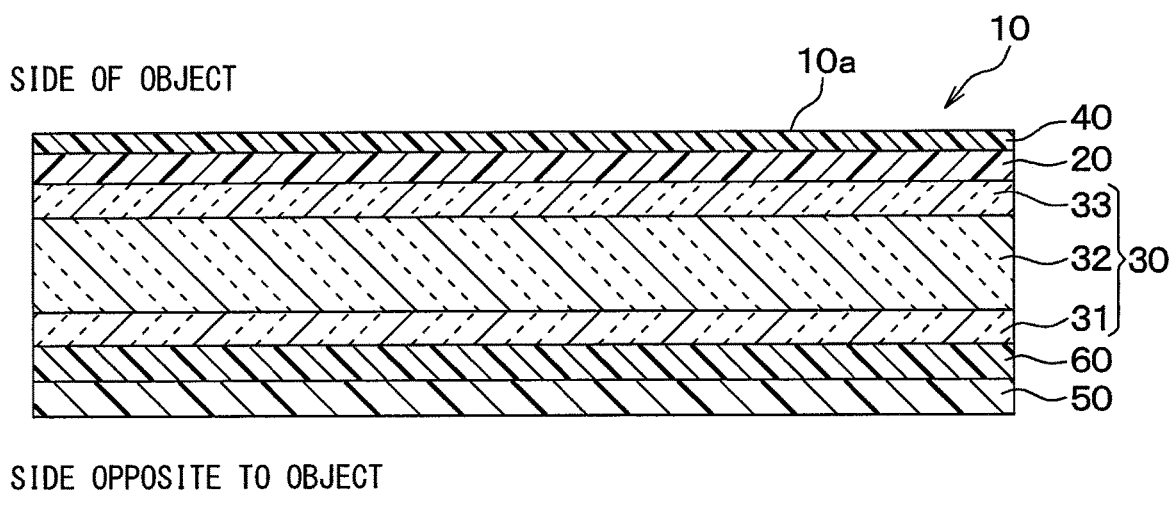
FIG. 16 is a cross sectional view of a heater device in a fifth embodiment.

As shown in FIG. 16, the heater device 1 of the present embodiment is different from the heater device 1 of the fourth embodiment regarding the arrangement place of the detection layer 60 in the heater main body 10.

The detection layer 60 is disposed on the side opposite to the object with respect to the heat insulating layer 30.

According to this configuration, the heat conduction between the heat generating layer 20 and the detection layer 60 can be suppressed by the heat insulating layer 30. Therefore, as compared with the case where the detection layer 60 is disposed on the side of the object with respect to the heat insulating layer 30, the heat conduction from the heat generating layer 20 to the detection layer 60 during operation of the heater main body 10 can be suppressed. Thereby, the amount of heat stored in the detection layer 60 can be reduced. Further, when the occupant 2 touches the one surface 10a of the heater body portion 10, the heat conduction from the detection layer 60 to the heat generating layer 20 can be suppressed.

Therefore, according to the heater device 1, as compared with the case where the detection layer 60 is disposed on the side of the object with respect to the heat insulating layer 30, it is possible to suppress the amount of heat transferring to the occupant 2 that touches the heater main body 10 from the heater main body 10.

Further, in the heater device 1 of the present embodiment, similarly to the heater device 1 of the third embodiment, the second layer 32 has a three-dimensional warp structure. Therefore, the elastic modulus of the second layer 32 is higher than that of the first layer 31. That is, the repulsive force of the second layer 32 is higher than that of the first layer 31. Thereby, when the one surface 10a of the heater main body 10 is pressed by the occupant 2, the second layer 32 can receive the pressing load. That is, by means of the second layer 32, the pressing load applied to the one surface 10a of the heater main body 10 can be transmitted to the detection layer 60 without being attenuated.

Therefore, according to the heater device 1 of the present embodiment, it is possible to improve the sensitivity of contact detection by the detection layer 60, as compared with the case where the second layer 32 has a lower elastic modulus than the first layer 31.

In the heater device 1 of the present embodiment, the first layer 31, the second layer 32, and the third layer 33 are woven together. As a result, each layer 31, 32, 33 constituting the heat insulating layer 30 is fixed to each other.

Here, it is conceivable that each layer 31, 32, 33 constituting the heat insulating layer 30 is not fixed to each other. In this case, when one surface 10a of the heater main body 10 is pressed by the occupant 2, the layers constituting the heat insulating layer 30 are displaced from each other. When the layers constituting the heat insulating layer 30 are displaced, it is impossible to transmit all the pressing loads to the detection layer 60.

On the other hand, according to the heater device 1 of the present embodiment, it is possible to transmit all the pressing loads when the one surface 10a of the heater main body 10 is pushed by the occupant 2 to the detection layer 60.

Sixth Embodiment

In the heater device 1 of the present embodiment, the relationship between the elastic modulus magnitudes of the second layer 32 and that of the third layer 33 of the heat insulating layer 30 is different from that of the heater device 1 of the third embodiment.

As in the second embodiment, the heat insulating layer 30 has a first layer 31, a second layer 32, and a third layer 33, as shown in FIG. 9.

As shown in FIGS. 11A and 11B, the first layer 31 is composed of the woven fabric in which the warp 31a and the weft 31b are woven.

As shown in FIGS. 11A and 11B, the first layer 31 is composed of the woven fabric in which the warp 31a and the weft 31b are woven.

Figure 17A:
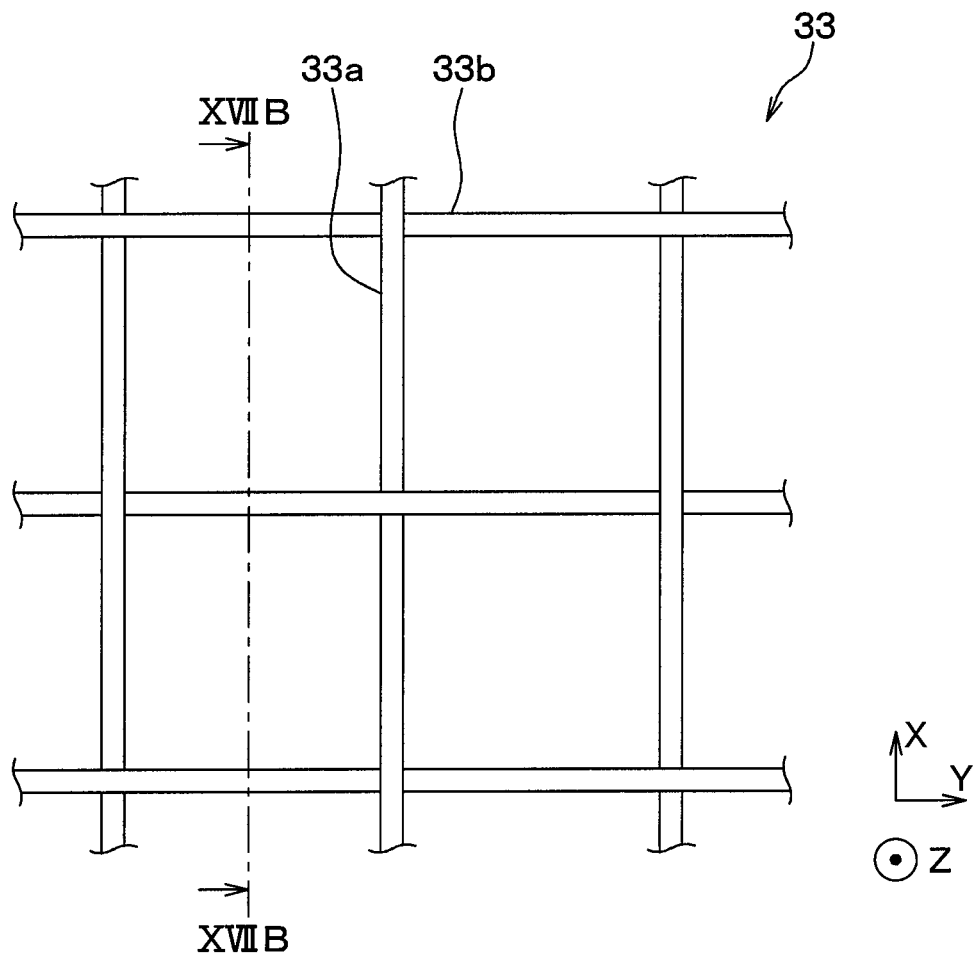
FIG. 17A is a diagram illustrating a plan view of a part of a third layer in a sixth embodiment.
Figure 17B:
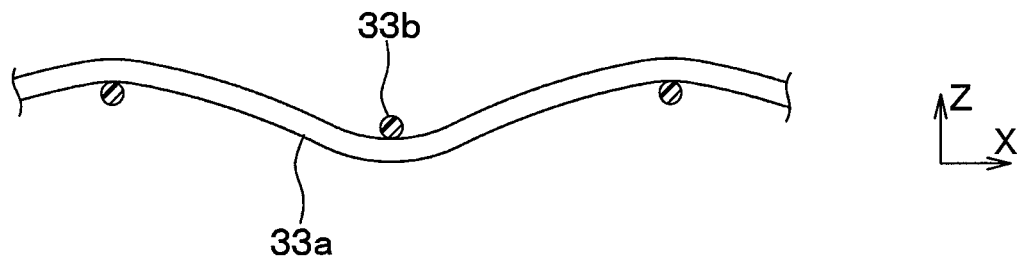
FIG. 17B is a diagram illustrating a cross sectional view of the third layer taken along line XVIIB-XVIIB in FIG. 17A.

As shown in FIGS. 17A and 17B, the third layer 33 is formed of the woven fabric in which the warp 33a and the weft 33b are woven. This fabric is woven in the same weave way as the first layer 31. The size of each of the voids of the third layer 33 is smaller than the size of each of the voids of the second layer 32 and is larger than the size of each of the voids of the first layer 31. As a result, the porosity of the third layer 33 is lower than the porosity of the second layer 32 and is higher than the porosity of the first layer 31.

Figure 10B:
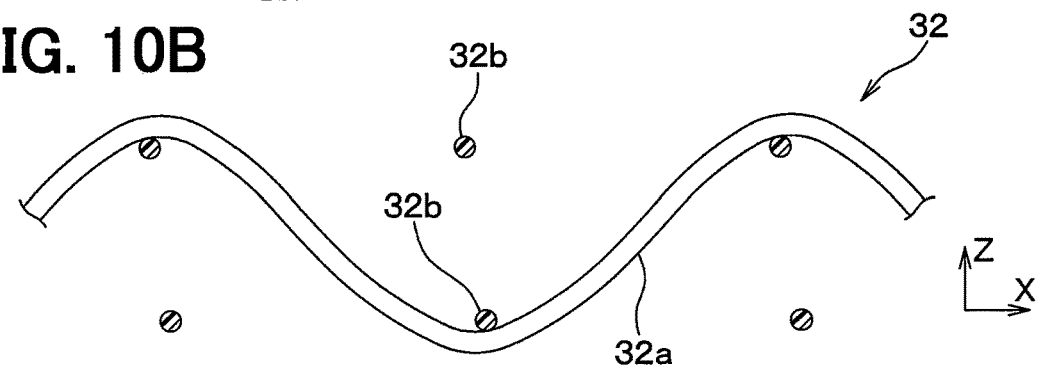
FIG. 10B is a diagram illustrating a cross sectional view of the second layer taken along line XB-XB in FIG. 10A.
Figure 10C:
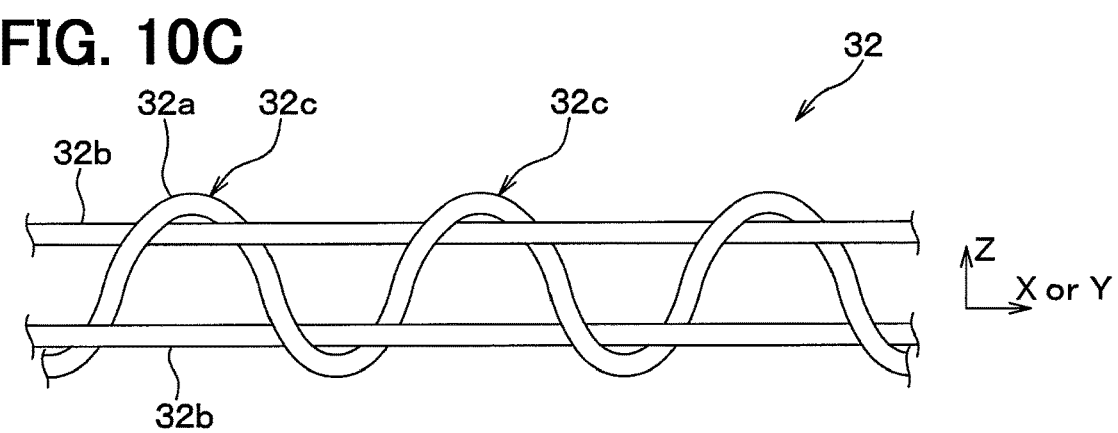
FIG. 10C is a diagram illustrating a side view of a part of the second layer in the third embodiment.

As in the third embodiment, as shown in FIGS. 10A, 10B and 10C, the second layer 32 is composed of the fabric having a three-dimensional warp structure. However, in the present embodiment, the warp 32a of the second layer 32 is set in a state in which the undulation in the thickness direction of the second layer 32 becomes large as compared with the plurality of fibers 31a and 31b constituting the first layer 31 and the plurality of fibers 33a and 33b constituting the third layer 33. Therefore, the elastic modulus of the entire second layer 32 is larger than the elastic modulus of the entire first layer 31 and the elastic modulus of the entire third layer 33.

As a result, even if the porosity of the second layer 32 is higher than both the porosity of the first layer 31 and the porosity of the third layer 33, the repulsive force of the second layer 32 generated when the second layer 32 is pressed can be made higher than the repulsive force of the first layer 31 and the third layer 33. Therefore, as compared with the case where the elastic modulus of the entire layer of the second layer 32 is smaller than both of the elastic modulus of the entire layer of the first layer 31 and the elastic modulus of the entire layer of the third layer 33, the second layer 32 becomes strong against the load when the second layer 32 is pressed. Therefore, also in the present embodiment, effects similar to those of the third embodiment can be obtained.

If the warp 32a of the second layer 32 is in the above state, the third layer 33 may be made of the woven fabric woven in the weave different from that of the first layer 31. The first layer 31 and the third layer 33 may be composed of a cloth made of a plurality of fibers other than the woven fabric as in the description of the third embodiment.

Further, as in the description of the second embodiment, the porosity of the third layer 33 may be lower than the porosity of the first layer 31. However, as described in the second embodiment, the porosity of the third layer 33 is preferably higher than the porosity of the first layer 31.

Another Embodiment (1) In the first embodiment, the first layer 31 and the second layer 32 of the heat insulating layer 30 are woven together, but the above mentioned embodiments are not limited thereto. The first layer 31 and the second layer 32 may be composed of a woven fabric in which the first layer 31 and the second layer 32 are woven separately. In this case, the first layer 31 and the second layer 32 are bonded with an adhesive. Accordingly, the layers 31 and 32 constituting the heat insulating layer 30 may be fixed to each other.

(2) In the second embodiment, the first layer 31, the second layer 32, and the third layer 33 of the heat insulating layer 30 are woven together, but the above mentioned embodiments are not limited thereto. The first layer 31, the second layer 32, and the third layer 33 may be composed of a woven fabric in which the first layer 31, the second layer 32, and the third layer 33 are separately woven. In this case, each of the layers 31, 32, 33 constituting the heat insulating layer 30 is bonded with an adhesive. Accordingly, the layers 31, 32, 33 constituting the heat insulating layer 30 may be fixed to each other.

(3) In the first embodiment, both the first layer 31 and the second layer 32 of the heat insulating layer 30 are the woven fabrics made of a plurality of synthetic resin fibers, but the material of the plurality of fibers is not limited thereto. As the plurality of fibers, materials other than synthetic resin such as silica fiber and glass fiber may be used. The same applies to the third layer 33 of the second embodiment.

(4) In the first embodiment, the first layer 31 and the second layer 32 of the heat insulating layer 30 are the woven fabrics of a plurality of fibers, but the above mentioned embodiments are not limited thereto. Each of the first layer 31 and the second layer 32 may be composed of a cloth made of a plurality of fibers other than the woven fabric. As the cloth other than the woven fabric, a knitted fabric in which a plurality of fibers are knitted, a nonwoven fabric made of a plurality of fibers, and a net-like material in which a plurality of fibers are formed into a net shape can be listed. The woven fabric has a structure in which the warp and the weft intersect. Knitting is a thing made one by one in a manner to make a knot. Further, the first layer 31 and the second layer 32 may be composed of a porous body not using fibers. As example of the porous body, an urethane foam, that is, a porous body made of urethane resin is listed. In this case, the density of the urethane foam constituting the second layer 32 is made smaller than the density of the urethane foam constituting the first layer 31. Thereby, the porosity of the second layer 32 can be made higher than the porosity of the first layer 31.

Similarly, in the second embodiment, the first layer 31, the second layer 32, and the third layer 33 of the heat insulating layer 30 are the woven fabrics of a plurality of fibers, but the above mentioned embodiments are not limited thereto. Each of the first layer 31, the second layer 32, and the third layer 33 may be composed of a cloth made of a plurality of fibers other than the woven fabric. Each of the first layer 31, the second layer 32, and the third layer 33 may be composed of a porous body not using fibers.

(5) In each of the above embodiments, the second layer 32 is disposed on the side of the heat generating layer 20 with respect to the first layer 31, but the above mentioned embodiments are not limited thereto. The second layer 32 may be disposed on the side of the first layer 31 opposite to the heat generating layer 20. In short, the second layer 32 may be arranged side by side in the thickness direction of the heat insulating layer 30 with respect to the first layer 31.

(6) In each of the above embodiments, the heat generating layer 20 has the plurality of heat generating parts 22 and the plurality of heat radiating parts 23, but the above embodiments are not limited thereto. The heat generating part may also serve as the heat radiating part. That is, the heat generating layer may have a plurality of heat radiation parts. In this case, each of the plurality of heat radiation parts may radiate the radiant heat by the heat generation by itself.

(7) In each of the above-described embodiments, the housing portion 50 is a member separate from the instrument panel, but is not limited thereto. The housing portion 50 may be constituted by a part of the instrument panel.

(8) In each of the above-described embodiments, the heater main body 10 is installed on the lower surface of the steering column 5 so as to face the occupant 2, but the above-described embodiments are not limited thereto. For example, the heater main body 10 may be installed on a surface of the instrument panel of the vehicle facing the vehicle rear side, a glove box of the vehicle, a seat back of the vehicle, or the like.

(9) In each of the above embodiments, the heat generating layer 20 is configured so that the temperature of the portion touched by the occupant 2 rapidly decreases when the occupant 2 touches the heater main body 10. However, the above embodiments are not limited to this configuration. The heat generating layer 20 may not be configured in this way.

The present disclosure is not limited to the above-described embodiment, but can be appropriately changed within the scope described in the claims, and includes various modifications and modifications within the equivalent scope. Further, the above described embodiments are not unrelated to each other, and can be appropriately combined, unless the combination is clearly impossible. In each of the above embodiments, it goes without saying that the elements constituting the embodiment are not necessarily indispensable except in the case where it is clearly indispensable to be essential and the case where it is considered to be obviously indispensable in principle. In each of the above embodiments, when numerical values such as the number, the numerical value, the quantity, the range, and the like of the constituent elements of the embodiment are mentioned, it is clearly stated that it is particularly indispensable, and in principle it is limited to a specific number except for the case where it is limited to that specific number. In addition, when referring to the materials, shapes, positional relationships, and the like of the constituent elements in the above embodiments, unless otherwise specified and in principle limited to a specific material, shape, positional relationship, etc., the material, the shape, the positional relationship and the like are not limited.

Summary

According to the first aspect shown in part or all of the above embodiments, the heater device includes the heater main body. The heater main body includes the heat generating layer and the heat insulating layer. The heat insulating layer has a sheet-like first layer having voids and a sheet-like second layer having voids and arranged side by side in the thickness direction of the heat insulating layer with respect to the first layer. The porosity of the second layer is higher than that of the first layer.

According to the second aspect, the second layer is disposed on the heat generating layer side of the first layer. The second layer has a higher effect of suppressing the heat conduction than the first layer. Therefore, the heat conduction from the heat generating layer to the first layer can be suppressed by the second layer. This makes it possible to suppress the amount of heat stored in the first layer to a smaller amount than in the case where the second layer is disposed on the side opposite to the heat generating layer of the first layer. Therefore, according to this heater device, it is possible to further reduce the amount of heat stored in the entire heat insulating layer, as compared with the case where the second layer is disposed on the side opposite to the heat generating layer of the first layer. Therefore, it is possible to further suppress the amount of heat transfer from the heater main body to the user who touches the heater main body.

According to the third aspect, the heat insulating layer further has a third layer having voids. The third layer is disposed on the heat generating layer side of the second layer and has a higher elastic modulus than the second layer.

Generally, the layer having voids tends to deform as the porosity increases. Therefore, in the case where the second layer having the porosity higher than that of the first layer is adjacent to the heat generating layer, when the user touches the surface of the heater main body, the portion touched by the user is easy to dent. On the other hand, in a state in which the heater main body is installed, the peripheral member of the heater main body is not usually dented only when the user touches it. Therefore, the feeling when the user touches the surface of the heater main body and the feeling when the user touches the peripheral member are very different.

On the other hand, in the heater device according to the third aspect, a third layer having a higher modulus of elasticity than the second layer is disposed between the heat generating layer and the second layer. Therefore, as compared with the case where the third layer is not provided, when the user touches the surface of the heater main body, the portion touched by the user can be made less prone to dent. Therefore, in the heater device according to the third aspect, it is possible to reduce the difference between the feeling when the user touches the surface of the heater main body and the feeling when the user touches the peripheral member.

According to the fourth aspect, the porosity of the third layer is higher than that of the first layer. According to this configuration, it is possible to reduce the heat capacity of the entire heat insulating layer as compared with the case where the porosity of the third layer is lower than that of the first layer. Therefore, in order to reduce the heat capacity of the entire heat insulating layer, it is preferable to have this configuration.

According to the fifth aspect, the elastic modulus of the second layer is higher than that of the first layer. According to this configuration, even if the porosity of the second layer is higher than the porosity of the first layer, the repulsive force of the second layer generated when the second layer is pressed is higher than the repulsive force of the first layer it can. Therefore, as compared with the case where the elastic modulus of the second layer is lower than the elastic modulus of the first layer, the second layer becomes strong against the load when pressed. As a result, when the user touches the surface of the heater main body, it is possible to make it difficult for the user to touch the portion touched by the user. Therefore, according to the heater device of the fifth aspect, it is possible to reduce the difference between the feeling when the user touches the surface of the heater main body and the feeling when the user touches the peripheral member.

According to the sixth aspect, the first layer is composed of a cloth made of a plurality of fibers. The second layer is composed of a woven fabric in which a plurality of fibers are woven. The predetermined fiber among the plurality of fibers constituting the second layer is in a state in which the undulation in the thickness direction of the second layer is large as compared with the plurality of fibers constituting the first layer. Specifically, the configuration of the sixth aspect can be adopted as the configuration of the fifth aspect.

According to the seventh aspect, the heat insulating layer further has a third layer having voids. The third layer is disposed on the heat generating layer side of the second layer and has a lower porosity than the second layer. The first layer is composed of a cloth made of a plurality of fibers. The second layer is composed of a woven fabric in which a plurality of fibers are woven. The third layer is composed of a cloth made of a plurality of fibers. The predetermined fiber among the plurality of fibers constituting the second layer is in a state in which the undulation in the thickness direction of the second layer is larger as compared with the plurality of fibers constituting the first layer and the plurality of fibers constituting the third layer.

According to this configuration, the elastic modulus of the entire second layer can be made larger than the elastic modulus of the entire first layer and the elastic modulus of the entire third layer. Therefore, even if the porosity of the second layer is higher than both of the porosity of the first layer and the porosity of the third layer, the repulsive force of the second layer, which is generated when the second layer is pressed, can be larger than the repulsive force of the first and third layers. Therefore, as compared with the case where the elastic modulus of the second layer is smaller than the elastic modulus of the first layer and the elastic modulus of the third layer, the second layer becomes strong regarding the load when pressed. As a result, when the user touches the surface of the heater main body, the portion touched by the user becomes difficult to dent. Therefore, in the heater device according to the seventh aspect, it is possible to reduce the difference between the feeling when the user touches the surface of the heater main body and the feeling when the user touches the peripheral member.

According to the eighth aspect, in the seventh aspect, the porosity of the third layer is higher than that of the first layer. According to this configuration, it is possible to reduce the heat capacity of the entire heat insulating layer as compared with the case where the porosity of the third layer is lower than that of the first layer. Therefore, in order to reduce the heat capacity of the entire heat insulating layer, it is preferable to have this configuration.

According to the ninth aspect, the heater device further includes a detection layer for detecting contact of the object to the surface on the object side of the heater body. The detection layer is disposed on the side opposite to the object of the heat generating layer. In this way, it is preferable that the heater main body has the detection layer.

According to the tenth aspect, the detection layer is disposed on the side opposite to the object of the heat insulating layer. According to this configuration, the heat conduction between the heat generating layer and the detection layer can be suppressed by the heat insulating layer. Therefore, as compared with the case where the detection layer is disposed on the object side of the heat insulating layer, the heat conduction from the heat generating layer to the detection layer during operation of the heater main body can be suppressed. Thereby, the amount of heat stored in the detection layer can be reduced. In addition, when the object is brought into contact with the surface of the heater main body, the heat conduction from the detection layer to the heat generating layer can be suppressed. Therefore, according to this heater device, as compared with the case where the detection layer is disposed on the object side of the heat insulating layer, it is possible to suppress the amount of heat transfer from the heater main body to the user who touches the heater main body.

According to the eleventh aspect, the layers constituting the heat insulating layer are fixed to each other. According to this configuration, it is possible to reduce the number of assembling steps as compared with a case where the respective layers constituting the heat insulating layer are not fixed to each other in the assembly of the heater main body. For this reason, it is preferable to have this configuration.

In addition, in the heater device according to the tenth aspect, when the surface of the heater main body is pressed, the respective layers constituting the heat insulating layer are deviated from each other unless the layers constituting the heat insulating layer are fixed to each other. For this reason, it is impossible to transmit all of the pressing load to the detection layer. On the other hand, by applying the heater device in the eleventh aspect to the heater device in the tenth aspect, it is possible to transmit all of the pressing load when the surface of the heater main body is pressed to the detection layer.

What is claimed is:

1. A heater device for radiating radiant heat toward an object, comprising:
    a heater main body including a sheet-like heat generating layer that generates heat and radiates the radiant heat, and a sheet-like heat insulating layer being disposed on a side opposite to the object with respect to the heat generating layer, wherein
    the heat insulating layer has a sheet-like first layer having voids, and a sheet-like second layer having voids and being disposed side by side in a thick direction of the heat insulating layer with respect to the first layer,
    a porosity of the second layer is higher than that of the first layer,
    the second layer is disposed on a side of the heat generating layer with respect to the first layer,
    the heat insulating layer has a third layer having voids,
    the third layer is disposed on a side of the heat generating layer with respect to the second layer, and has a larger elastic modulus than the second layer, and
    the third layer having a lower porosity than that of the second layer.

2. The heater device according to claim 1, wherein the third layer has a higher porosity than the first layer.

3. The heater device according to claim 1, wherein the second layer has a larger elastic modulus than the first layer.

4. The heater device according to claim 1, wherein
the first layer is composed of a cloth made of a plurality of fibers,
the second layer is composed of a woven fabric in which a plurality of fibers are woven, and
a predetermined fiber among the plurality of fibers constituting the second layer is in a state in which the undulation in the thickness direction of the second layer is large as compared with the plurality of fibers constituting the first layer.

5. The heater device according to claim 1, further comprising:
a detection layer being configured to detect a contact of the object to a surface on the object side of the heater main body, wherein
the detection layer is disposed on a side opposite to the object of the heat generating layer.

6. The heater device according to claim 5, wherein
the detection layer is disposed on a side opposite to the object of the heat insulating layer.

7. The heater device according to claim 1, wherein the layers constituting the heat insulating layer are fixed to each other.

8. A heater device for radiating radiant heat toward an object, comprising:
a heater main body including a sheet-like heat generating layer that generates heat and radiates the radiant heat, and a sheet-like heat insulating layer being disposed on a side opposite to the object with respect to the heat generating layer, wherein
the heat insulating layer has a sheet-like first layer having voids, and a sheet-like second layer having voids and being disposed side by side in a thick direction of the heat insulating layer with respect to the first layer,
a porosity of the second layer is higher than that of the first layer,
the second layer is disposed on a side of the heat generating layer with respect to the first layer,
the heat insulating layer has a third layer having voids,
the third layer is disposed on a side of the heat generating layer with respect to the second layer, and has a larger elastic modulus than the second layer,
the first layer is composed of a cloth made of a plurality of fibers,
the second layer is composed of a woven fabric in which a plurality of fibers are woven, and
a predetermined fiber among the plurality of fibers constituting the second layer is in a state in which the undulation in the thickness direction of the second layer is large as compared with the plurality of fibers constituting the first layer.

9. The heater device according to claim 8, wherein
the third layer has a lower porosity than the second layer.

10. The heater device according to claim 8, wherein
the third layer has a higher porosity than the first layer.

11. The heater device according to claim 8, wherein
the second layer has a larger elastic modulus than the first layer.

* * * * *